July 28, 1953    F. BOOTH    2,647,157
ELECTRICAL STORAGE BATTERY
Filed April 24, 1950
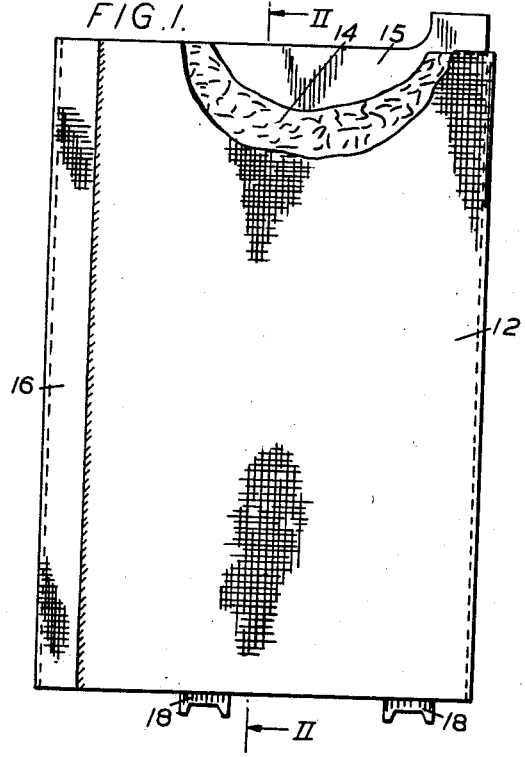
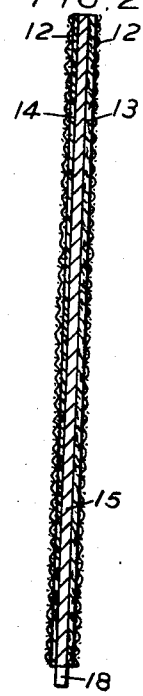
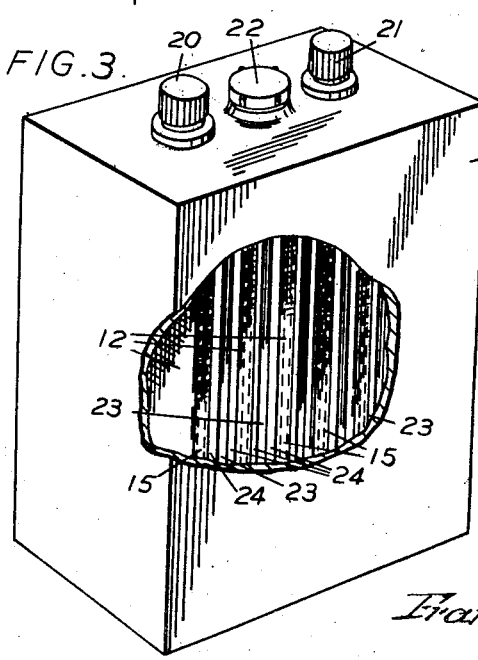
Inventor
Frank Booth
By
Attorney Patented July 28, 1953

2,647,157

UNITED STATES PATENT OFFICE 2,647,157

ELECTRICAL STORAGE BATTERY

Frank Booth, Denton, near Manchester, England, assignor to Oldham & Son Limited, Denton, near Manchester, England, a British company Application April 24, 1950, Serial No. 157,701
In Great Britain May 3, 1949

4 Claims. (Cl. 136—147)

This invention relates to electrical storage batteries.

In the construction of storage batteries the positive plates are usually cast in grid form from an alloy of lead and antimony in which the lead predominates and the interstices are filled with the active paste of the various lead oxides.

To prevent metallic conduction between closely packed positive and negative plates by "treeing" in the negative plates, and to prevent short circuiting by buckling, whilst permitting adequate electrolytic conduction between the plates, separators of sheet form of various kinds have been interposed.

Some separators are made from porous material such as thin sheets of balsa wood, or wood veneer or micro-porous rubber, whilst perforated separators are made from perforated hard rubber; the latter however are generally used with a micro-porous separator on the negative side.

To retain the active peroxide material in place on the positive plate, thin fibrous glass mats are commonly interposed between a micro-porous or a perforated separator, the fibres of these retaining mats having a thickness varying between .0002 and .0010 inch, the sheets of matted fibres being of a thickness of about $\frac{1}{32}$ inch. The fineness of the interstices of the mat is such as to effectively retain particles of the active material without loss of conductivity.

The main object of the present invention is to construct a separator which firmly holds the retaining mats to the plate before assembly in the battery, thereby preventing damage to the mats during assembly, gives free conductivity of the electrolyte, and provides for immediate release of bubbles of gas.

A further main object is to improve the retaining properties of the standard type of glass fibre retainer mats and to provide a positive plate assembly in which the said retainer mats are securely held in position in relation to the plate both before and after assembly in the battery.

A positive plate assembly for an electrical storage battery constructed according to the present invention is formed by applying a retainer mat to each face of the positive plate, coating at least the marginal edges of a suitably shaped sheet of a substantially inextensible woven sheet material inert to the acid of an electric battery with a thermoplastic material, tightly wrapping said sheet across and about said retainer mats and said positive plate so as closely to envelop said mats and said plate, and applying heat to said marginal edges to weld said edges together by fusing said coating material and to hold said mats firmly in position in contact with the active material of said plate. The material employed for the separator has considerable porosity and results in a high degree of electrolytic conduction.

The thermoplastic material employed is preferably polyvinyl chloride. Alternatively, the marginal areas of the sheet may be coated with rubber and welded together by vulcanization.

The woven wrapping is preferably an open weave glass fibre material (i. e. 1 mm. to 6 mm. mesh), although other materials may also be employed which provide a substantially inextensible wrapping about the plate assembly.

The marginal edges of the sheet material from which the wrapping is made may be coated by treating only the edges, e. g. by dipping in sealing material, but preferably the whole sheet is coated to facilitate welding of a flap passing under the electrode to the body of the wrapping as hereafter explained.

In order that the invention may be more clearly understood, a preferred embodiment thereof in which the wrapping is formed of open weave fibre glass material coated with a thermoplastic will now be explained by way of example, reference being made to the accompanying drawing, in which:

Figure 1 is an elevation of the wrapping,

Figure 2 is a section on the line II—II of Figure 1,

Figure 2a is a view similar to Figure 2 showing a modification in the construction of the separator hereafter referred to, and Figure 3 is a perspective view of a battery cut away to show the plates therein.

The wrapping 12 is made up of open weave woven glass material of two strand filaments woven at 20 courses per inch. The mesh opening of the wrapping 12 is then about 1 mm. square. The wrapping 12 is cut to suitably rectangular form from a larger piece of material which has been coated with polyvinyl chloride and allowed to dry.

The glass fabric retaining mats 13, 14 are placed on the two faces of the positive plate 15 in contact with the active material and the suitably shaped wrapping 12 wound tightly round the mats 13, 14 and plate 15 so as to hold the mats 13, 14 in intimate relation with the active material. The edges of the wrapping 12 are overlapped and welded together by the application of heat along the overlap 16; the polyvinyl chloride coating on the two laps fuse and so seal the edges together. Dropping of the active material from the plate 15 is considerably delayed by the intimate contact between the mats 13, 14 and the plate 15.

In a modification, illustrated in Figure 2a, one side of the wrapping 12 is longer than the other as indicated by the reference 12a so that a flap is formed and after the vertical edges have been sealed together along the overlap 16, the flap 12a of the longer side is folded under plate 15 and on the wrapping and there secured in manner already described with reference to overlap 16, thus forming a bag in which plate 15 and mats 13, 14 are encompassed. Before being wrapped round plate 15, the wrapper 12 is provided with apertures to allow the usual lugs 18 to protrude from the bag.

Referring to Figure 3, the battery has the case 19, terminals 20, 21 and filling aperture 22. The positive plates 15 and the negative plates 23 are supported in the normal manner and each positive plate is provided with a wrapper 12 enclosing retainer mats. Between the sides of the wrappers 12 and the adjacent negative plates are located micro-porous or perforated separators 24 of known kind to give necessary electrolyte space in the discharge and to prevent "treeing."

In place of polyvinyl chloride, a coating of polyethylene may be applied to the wrapper 12, securing of the overlaps 16, being effected by the application of heat as before. Again, the coating may be achieved by means of a solution of any thermoplastic material that can be brought into solution and that can be fused under heat and pressure, e. g. methyl methacrylate polymer in chloroform, or polystyrene in toluol or xylene.

The wrapping 12 according to this invention acts as a separator. It does not restrict the electrolyte conduction permitted by retaining mats 13, 14, firmly holds the latter in position and is easy to manufacture.

I claim:

1. A method of making a positive plate assembly for an electrical storage battery, which comprises the steps of applying a retainer mat to each face of a positive plate, coating at least the marginal edges of a suitably shaped sheet of a substantially inextensible woven sheet material inert to the acid of an electric battery with a thermoplastic material, tightly wrapping said sheet across and about said retainer mats and said positive plate so as closely to envelop said mats and said plate, and applying heat to said marginal edges to weld said edges together by fusing said coating material and to hold said mats firmly in position in contact with the active material of said plate.

2. A method of making a positive plate assembly as claimed in claim 1, in which the said thermoplastic material is polyvinyl chloride.

3. A method of making a positive plate assembly for an electrical storage battery, which comprises the steps of applying a retainer mat to each face of a positive plate, coating at least the marginal edges of a suitably shaped sheet of a substantially inextensible open weave glass fibre material with a thermoplastic material, tightly wrapping said sheet across and about said retainer mats and said positive plate so as closely to envelop said mats and said plate, and applying heat to said marginal edges to weld said edges together by fusing said coating material and to hold said mats firmly in position in contact with the active material of said plate.

4. A method of making a positive plate assembly for an electrical storage battery, which comprises the steps of applying a retainer mat to each face of a positive plate, coating at least the marginal edges of a suitably shaped sheet of a substantially inextensible woven sheet material inert to the acid of an electric battery with rubber, tightly wrapping said sheet across and about said retainer mats and said positive plate so as closely to envelop said mats and said plate, and vulcanising the rubber to weld said edges together and to hold said mats firmly in position in contact with the active material of said plate.

FRANK BOOTH.

References Cited in the file of this patent

UNITED STATES PATENTS

| Number | Name | Date |
|---|---|---|
| 309,939 | Faure | Dec. 30, 1884 |
| 1,171,597 | Davis | Feb. 15, 1916 |
| 1,771,216 | Gossler | July 22, 1930 |
| 1,966,644 | Pollock | July 17, 1934 |
| 1,990,976 | Booss | Feb. 12, 1935 |
| 2,195,212 | Hall | Mar. 26, 1940 |
| 2,256,105 | Shank | Sept. 16, 1941 |
| 2,490,630 | Jardine | Dec. 6, 1949 |
| 2,504,608 | White | Apr. 18, 1950 |

FOREIGN PATENTS

| Number | Country | Date |
|---|---|---|
| 2,073 of 1884 | Great Britain | Jan. 24, 1884 |
| 1,396 of 1906 | Great Britain | Jan. 18, 1906 |
| 347,012 | Great Britain | Apr. 23, 1931 |
| 751,398 | France | June 19, 1933 |
| 664,775 | Great Britain | Jan. 9, 1952 |

OTHER REFERENCES

Gould: "The Gould Unit-Seal Envelope," Railway Age, December 9, 1944.